United States Patent
Ikeda et al.

(10) Patent No.: US 9,523,342 B2
(45) Date of Patent: Dec. 20, 2016

(54) IGNITION DEVICE FOR SPARK-IGNITION INTERNAL COMBUSTION ENGINE

(75) Inventors: Yuji Ikeda, Kobe (JP); Atsushi Nishiyama, Kobe (JP); Takeshi Serizawa, Ikeda (JP); Hiroaki Oi, Ikeda (JP)

(73) Assignee: IMAGINEERING, INC., Kobe-shi (JP)

( * ) Notice: Subject to any disclaimer, the term of this patent is extended or adjusted under 35 U.S.C. 154(b) by 123 days.

(21) Appl. No.: 14/129,618

(22) PCT Filed: Jul. 4, 2012

(86) PCT No.: PCT/JP2012/067084
§ 371 (c)(1),
(2), (4) Date: Mar. 27, 2014

(87) PCT Pub. No.: WO2013/005773
PCT Pub. Date: Jan. 10, 2013

(65) Prior Publication Data
US 2014/0224204 A1  Aug. 14, 2014

(30) Foreign Application Priority Data

Jul. 4, 2011  (JP) ................................. 2011-147857

(51) Int. Cl.
*F02B 51/00*  (2006.01)
*F01M 9/10*  (2006.01)
(Continued)

(52) U.S. Cl.
CPC ............... *F02P 15/001* (2013.01); *F01L 3/24* (2013.01); *F02B 23/08* (2013.01); *F02P 3/01* (2013.01);
(Continued)

(58) Field of Classification Search
CPC ...... F02P 23/045; F02M 57/005; F02M 57/06; F02D 35/027; F02B 77/085
(Continued)

(56) References Cited

U.S. PATENT DOCUMENTS 4,499,872 A * 2/1985 Ward ...................... F02B 23/08
                                                                  123/344
4,561,406 A * 12/1985 Ward ...................... F02B 23/08
                                                                  123/143 B
(Continued)

FOREIGN PATENT DOCUMENTS

EP        2264308 A1      12/2010
JP     2001-073920 A       3/2001
(Continued)

OTHER PUBLICATIONS

International Search Report, dated Oct. 9, 2012, issued in corresponding application No. PCT/JP2012/067084.

*Primary Examiner* — Marguerite McMahon
*Assistant Examiner* — Tea Holbrook
(74) *Attorney, Agent, or Firm* — Westerman, Hattori, Daniels & Adrian, LLP

(57) ABSTRACT

It is configured such that plasma generated at a time of ignition should diffuse over an entire combustion chamber in a spark ignition type internal combustion engine in order to improve fuel efficiency. An ignition device for a spark ignition type internal combustion engine is provided including an ignition plug and a transmission antenna provided in the vicinity of the ignition plug and adapted to transmit an electromagnetic wave to a combustion chamber. The ignition device allows a spark discharge generated between a central electrode and a ground electrode of the ignition plug to react with an electric field created via the transmission antenna in the combustion chamber so as to generate plasma and ignite fuel air mixture. A receiving antenna is arranged
(Continued)

on a combustion chamber-facing surface of at least one of an intake valve and an exhaust valve, and is adapted to receive the electromagnetic wave transmitted from the transmission antenna.

2 Claims, 4 Drawing Sheets

(51) Int. Cl.
    *F02P 15/00* (2006.01)
    *F02P 3/01* (2006.01)
    *H01T 13/40* (2006.01)
    *H01T 13/50* (2006.01)
    *F02B 23/08* (2006.01)
    *F01L 3/24* (2006.01)
    *F02P 13/00* (2006.01)
    *F02P 23/04* (2006.01)
    *F01L 3/04* (2006.01)
    *F01L 1/053* (2006.01)
    *F01L 1/14* (2006.01)

(52) U.S. Cl.
    CPC .............. *F02P 13/00* (2013.01); *F02P 23/045* (2013.01); *H01T 13/40* (2013.01); *H01T 13/50* (2013.01); *F01L 1/0532* (2013.01); *F01L 1/143* (2013.01); *F01L 3/04* (2013.01); *F01L 2001/0537* (2013.01); *F01L 2101/02* (2013.01); *Y02T 10/125* (2013.01)

(58) Field of Classification Search
    USPC ..................................... 123/2, 3, 536, 143 B
    See application file for complete search history.

(56) References Cited

U.S. PATENT DOCUMENTS

| | | | | |
|---|---|---|---|---|
| 4,774,914 A * | 10/1988 | Ward | ..................... | F02P 23/045 123/162 |
| 4,841,925 A * | 6/1989 | Ward | ..................... | H01T 13/50 123/143 B |
| 5,027,764 A * | 7/1991 | Reimann | ................. | F02P 23/04 123/143 B |
| 7,392,795 B2 * | 7/2008 | Nagamine | ........... | F02D 41/3041 123/143 B |
| 8,186,322 B2 * | 5/2012 | Ikeda | ..................... | B01D 53/32 123/143 B |
| 8,240,293 B2 | 8/2012 | Ikeda | | |
| 8,485,162 B2 * | 7/2013 | Ikeda | ........................ | F01L 3/02 123/536 |
| 8,499,746 B2 * | 8/2013 | Ikeda | ..................... | F02B 23/08 123/143 B |
| 8,910,619 B2 * | 12/2014 | Gingrich | ............... | F02P 23/045 123/143 B |
| 2007/0137611 A1 * | 6/2007 | Yu | ....................... | F02D 41/3047 123/304 |
| 2009/0229581 A1 * | 9/2009 | Ikeda | ..................... | B01D 53/32 123/536 |
| 2010/0180871 A1 * | 7/2010 | Ikeda | ..................... | F02B 23/08 123/536 |
| 2011/0031886 A1 * | 2/2011 | Ikeda | ........................ | F01L 3/02 315/111.21 |

FOREIGN PATENT DOCUMENTS

| | | | | |
|---|---|---|---|---|
| JP | 2007-113570 A | | 5/2007 | |
| JP | 2008-082286 A | | 4/2008 | |
| JP | WO 2009113690 A1 * | | 9/2009 | ............... F01L 3/02 |
| JP | 2009-281188 A | | 12/2009 | |
| JP | 2010-001827 A | | 1/2010 | |
| WO | 2009/113690 A1 | | 9/2009 | |

* cited by examiner

IGNITION DEVICE FOR SPARK-IGNITION INTERNAL COMBUSTION ENGINE

TECHNICAL FIELD

The present invention relates to an ignition device that is attached to a spark ignition type internal combustion engine that allows a spark discharge by an ignition plug to react with an electric field created in a combustion chamber so as to generate plasma, thereby igniting fuel air mixture.

BACKGROUND ART

Conventionally, in a spark ignition type internal combustion engine that is installed in a vehicle, especially an automobile, a spark discharge between a central electrode and a ground electrode of an ignition plug is employed to ignite fuel air mixture in a combustion chamber at each ignition timing. In recent years, plasma generated by a microwave in combination with the spark discharge is employed so as to improve ignition efficiency of the spark discharge as disclosed in, for example, Japanese Unexamined Patent Application, Publication No. 2010-1827.

In the ignition device disclosed in Japanese Unexamined Patent Application, Publication No. 2010-1827, an antenna is arranged in the vicinity of the ignition plug so as to emit a microwave to the combustion chamber, thereby forming a plasma generation region. A magnetron is connected to the antenna so as to emit the microwave toward the vicinity of a discharge gap of the ignition plug, thereby forming the plasma generation region in the vicinity of the discharge gap.

With such configuration, fuel air mixture is ignited due to spark discharge occurred in the plasma generation region during the expansion stroke, and thereby enlarging a flame kernel. Furthermore, the flame kernel reacts with radicals in the plasma to promote combustion. However, with the ignition device disclosed in Japanese Unexamined Patent Application, Publication No. 2010-1827, the plasma generation region can be formed only in the vicinity of the ignition plug. As a result, a good combustion may be attained only in the vicinity of the ignition plug. This means that the propagation process of combustion to the entire combustion chamber is almost same to that of the conventional spark ignition type internal combustion engine in which plasma is not employed. Therefore, it has been difficult to expect the improvement of the fuel efficiency by the plasma.

THE DISCLOSURE OF THE INVENTION

Problems to be Solved by the Invention

The present invention has been made in view of the above described circumstances, and it is an object of the present invention to improve fuel efficiency by configuring such that plasma should diffuse over the entire combustion chamber.

Means for Solving the Problems

In accordance with the present invention, there is provided an ignition device for a spark ignition type internal combustion engine, including: an ignition plug; and a transmission antenna that is provided in the vicinity of the ignition plug and is adapted to transmit an electromagnetic wave to an combustion chamber, wherein the ignition device allows a spark discharge generated between a central electrode and a ground electrode of the ignition plug to react with an electric field created via the transmission antenna in the combustion chamber so as to generate plasma and ignite fuel air mixture, characterized in that the ignition device further includes receiving antenna arranged on a combustion chamber-facing surface of at least one of an intake valve and an exhaust valve, and is adapted to receive the electromagnetic wave transmitted from the transmission antenna.

According to the configuration described above, the receiving antenna receives the electromagnetic wave transmitted from the transmission antenna. As a result of this, the electromagnetic wave creates the electric field expanding from the vicinity of the ignition plug up to a location where the receiving antenna is arranged. As a result of the expansion of the electric field, a generation range of the plasma also expands, and thus, the combustion is promoted in the entire combustion chamber. Accordingly, it is possible to improve fuel efficiency.

Effect of the Invention

Since the present invention is configured as described above, it is possible to expand the generation range of the plasma by expanding the electric field toward the receiving antenna, and thus it is possible to improve fuel efficiency.

BRIEF DESCRIPTION OF THE DRAWINGS

FIG. 1 is an enlarged cross-sectional view of a main part of an engine which an embodiment of the present invention is applied to;

BEST MODE FOR CARRYING OUT THE INVENTION

Figure 1:
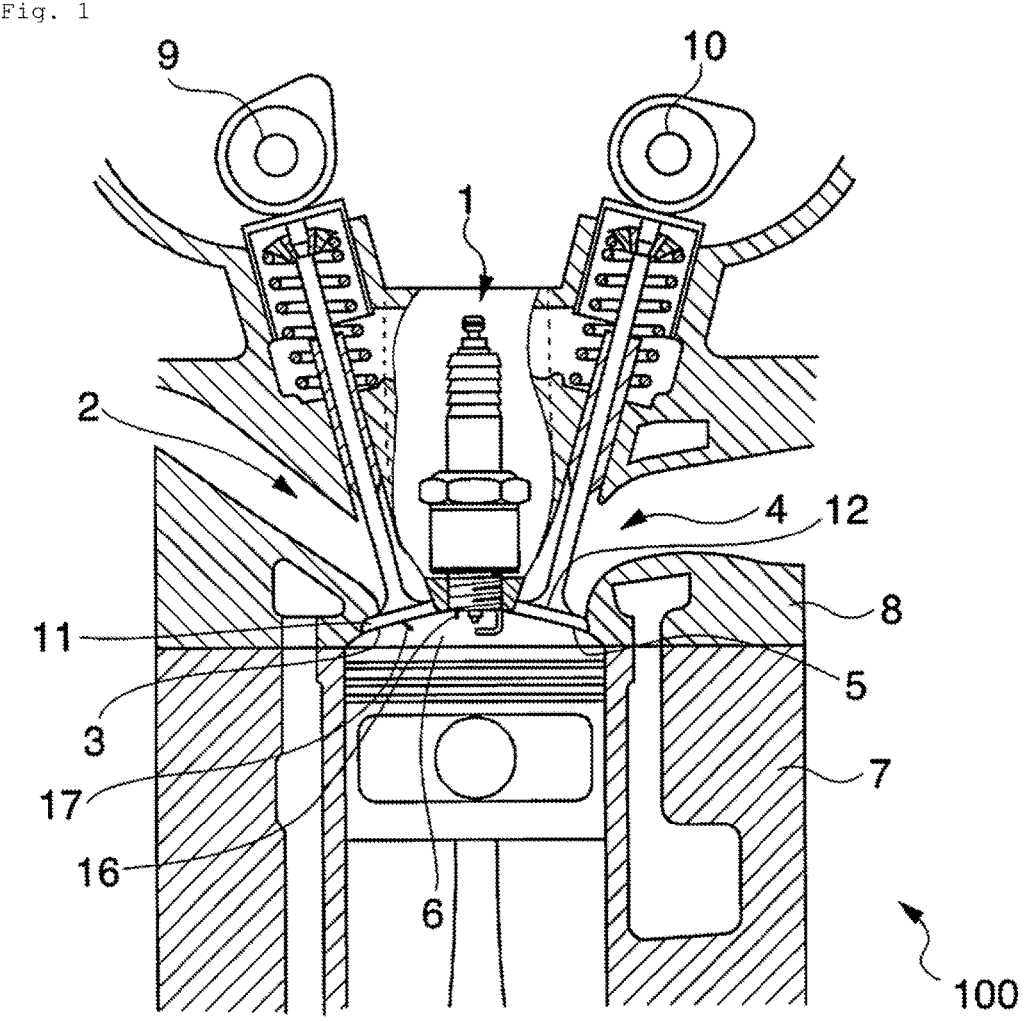
Figure 2:
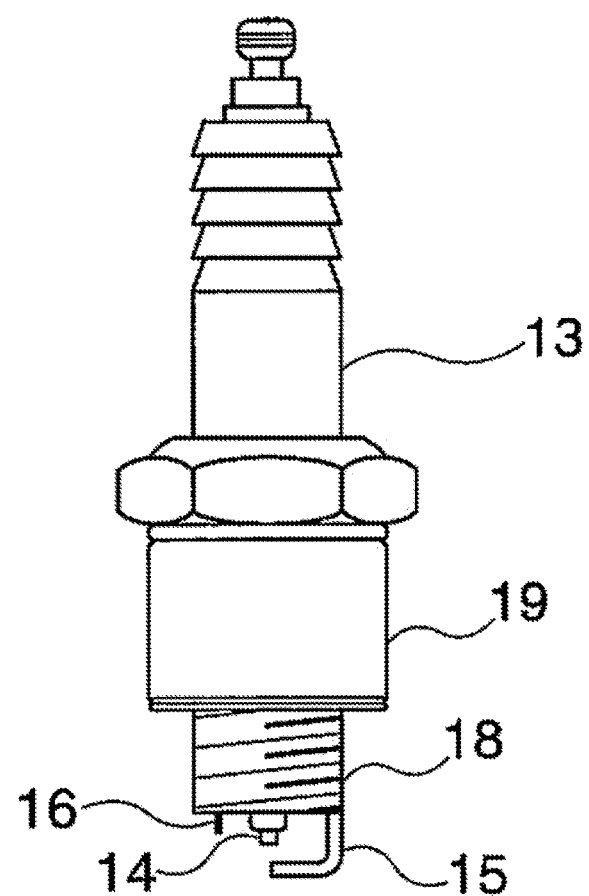
FIG. 2 is a front view of an ignition plug of the present embodiment.

FIG. 1 is an enlarged view of a part of an engine 100 which an ignition plug 1 is mounted to. The engine 100 is of a DOHC (Double OverHead Camshaft) type. In each cylinder, a pair of openings 3 for intake ports 2 and a pair of openings 5 for exhaust ports 4 are formed and arranged in face-to-face relationship with each other in relation to the ignition plug 1 as the center. The ignition plug 1 is attached approximately at a center of a ceiling part of a combustion chamber 6. The engine 100 is mounted to a cylinder block 7. Camshafts 9 and 10 are respectively attached on the intake side and the exhaust side of a cylinder head 8 that forms the ceiling part of the combustion chamber 6. The intake port 2 of the cylinder head 8 is opened and closed by an intake valve 11 which reciprocates by a rotation of the camshaft 9. Likewise, the exhaust port 4 of the cylinder head 8 is opened and closed by an exhaust valve 12 which reciprocates by a rotation of the camshaft 10. The ignition plug 1 is attached to the ceiling part of the combustion chamber 6. The intake port 2 includes a fuel injection valve (not shown) for producing fuel air mixture to be supplied to the combustion chamber 6. According to the present embodiment, the ignition plug 1 is attached to a location sandwiched between the two intake valves 11 and the two exhaust valves 12, i.e., approximately at the center of the ceiling part of the combustion chamber 6. As the engine 100 itself, except for the ignition plug 1, a spark ignition type engine which is known in the art may be employed.

The ignition plug 1 according to the present embodiment includes a housing 13 made of an electrically conductive material, a central electrode 14 accommodated in the housing 13 in an insulated manner, a ground electrode 15 arranged at a lower end of the housing 13 spaced apart from the central electrode 14, and a transmission antenna 16 for transmitting a microwave, which is an electromagnetic wave. Except for the transmission antenna 16, the ignition plug 1 may be configured the same as an ignition plug known in the art.

The transmission antenna 16 is provided with a tip end protruded from an insulator (not shown) in the vicinity of the central electrode 14 via a through hole provided in the insulator. The insulator supports the central electrode 14 in the housing 13 in an electrically insulated manner. The transmission antenna 16 is arranged in face-to-face relationship with the ground electrode 15 across the central electrode 14. The transmission antenna 16 has a length corresponding to a wavelength of the microwave so as not to function as a ground electrode.

As against the transmission antenna 16 described above, a receiving antenna 17 for receiving the microwave transmitted from the transmission antenna 16 is provided on a surface of the intake valve 11, the surface facing toward the combustion chamber 6, i.e., a lower surface of the intake valve 11. As the receiving antenna 17, any type of an antenna may be applicable as long as the antenna is excellent in electric conductivity and made of highly durable metal material. In the present embodiment, the receiving antenna 17 is made of the same material as the intake valve 11.

Figure 3:
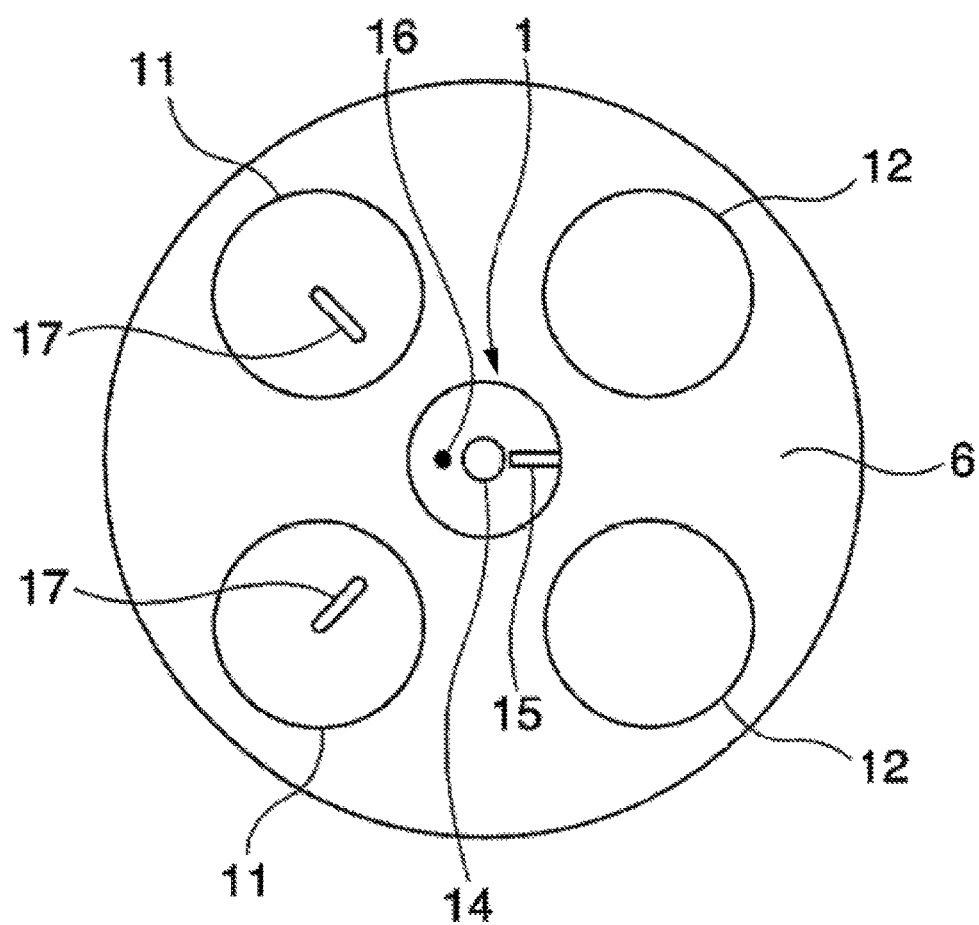
FIG. 3 is a view of a combustion chamber of the present embodiment viewed from a cylinder side.

As shown in FIG. 3, the receiving antenna 17 protrudes approximately from a central part of the lower surface of the intake valve 11 toward an extension line of the central electrode 14 of the ignition plug 1 in the combustion chamber 6. This means that the receiving antenna 17 is directed toward a direction in which an axis line of the receiving antenna 17 intersects with the extension line of the central electrode 14 at a location downward from the ignition plug 1. This makes it possible to minimize the peel of a tumble flow at a time of combustion, which will be described later. The shape of the receiving antenna 17 is not limited to a specific shape and may be cuspidate, planar, or the like.

A protrusion length of the receiving antenna 17 of the shape described above is set to, for example, a quarter wavelength of the microwave. The length of the receiving antenna 17 is determined for the purpose of maximizing the reception efficiency of the microwave. The receiving antenna 17 does not necessarily have a metal part exposed therefrom, and may be covered by an insulator such as ceramic to improve durability.

In the configuration described above, the transmission antenna 16 is connected to a magnetron, which is a microwave generation device that outputs the microwave. Meanwhile, the ignition plug 1 is connected to an igniter. The engine 100 itself is electrically maintained to a ground potential. The ground electrode 15 of the ignition plug 1 is maintained to the ground potential, and the receiving antenna 17 is constantly maintained to the ground potential.

When fuel air mixture in the combustion chamber 6 is ignited by means of the ignition plug 1, the engine 100 is designed to allow the spark discharge of the ignition plug 1 to react with an electric field created in the combustion chamber 6 so as to generate plasma. In this manner, an ignition region is enlarged in comparison with an ignition by spark discharge in a case in which the plasma is not generated. By way of the microwave outputted from the magnetron, the transmission antenna 16 creates the electric field in a space including a discharge gap formed between the central electrode 14 and the ground electrode 15 of the ignition plug 1. The electric field expands toward a lower side of the intake valve 11 by the microwave progressing toward the receiving antenna 17. By allowing the spark discharge to react with the electric field thus expanded, the plasma is generated, and a flame kernel is generated.

This means that the spark discharge is caused to occur at the ignition plug 1 by an ignition coil (not shown), and the electric field is created by the microwave approximately at the same time as or immediately before/after the start of the spark discharge. By allowing the spark discharge to react with the electric field, the plasma is generated so that the fuel air mixture is rapidly combusted in the combustion chamber 6. Here, "immediately after the start of the spark discharge" is preferably at the latest by the start of inductive discharge, which constitutes the spark discharge".

More specifically, the spark discharge by the ignition plug 1 generates the plasma in the electric field, and the fuel air mixture is ignited under the presence of the plasma. Consequently, the flame kernel that initiates flame propagation combustion is enlarged in comparison with the ignition by the spark discharge alone. Furthermore, owing to the presence of the plasma, a large amount of radicals are produced in the combustion chamber 6 so as to promote the combustion. The plasma does not stay in the vicinity of the ignition plug 1 alone, but expands up to the vicinity of the intake valve 11. Owing to the receiving antenna 17 provided on the lower surface of the intake valve 11, the microwave emitted from the transmission antenna 16 propagates through the space of the combustion chamber 6 toward the receiving antenna 17 and is received by the receiving antenna 17 while, on the other hand, a part of the microwave is reflected and diffuses in the combustion chamber 6. As a result of this, the electric field is widely created by the microwave in the combustion chamber 6 including the space from the transmission antenna 16 up to the receiving antenna 17. Accordingly, the plasma expands, as described above.

Under the presence of the plasma described above, flows of electrons by the spark discharge and ions and radicals produced by the spark discharge are caused to vibrate and meander under the influence of the electric field, consequently, increase their travel lengths, and thus, dramatically increase the number of times of collision with ambient molecules of water and nitrogen, thereby promoting the combustion. The molecules of water and nitrogen having collided with the ions and radicals become OH radicals and N radicals, and ambient gas having collided with the ions and radicals are ionized, i.e., brought into the plasma state, thereby the ignition region of the fuel air mixture is dramatically enlarged and the flame kernel that initiates the flame propagation combustion is also enlarged.

As a result of this, since the fuel air mixture is ignited by the plasma generated by the reaction of the spark discharge and the electric field, the ignition region expands, and two-dimensional ignition only by the ignition plug 1 is transformed into three-dimensional ignition. Accordingly, the initial combustion is stabilized, the combustion rapidly propagates in the combustion chamber 6 in association with the increase of the radicals described above, and the combustion expands at a high combustion speed.

Thus, owing to the receiving antenna 17 provided on the intake valve 11, it is possible to prevent the combustion from being destabilized in the vicinity of the intake valve 11 when the tumble flow of the fuel air mixture is generated in the cylinder during the expansion stroke. As described above, owing to the receiving antenna 17 provided on the lower surface of the intake valve 11, the plasma expands up to the vicinity of the intake valve 11, and thus, it is possible to secure the combustion, i.e., increase the combustion rate, even if the combustion tends to decrease in speed in the vicinity of the intake valve 11 under the influence of the tumble flow. Furthermore, according to the present embodiment, since the receiving antenna 17 is adjusted so that the axial direction of the receiving antenna 17 is oriented to a location on an extension line of the central electrode 14 of the ignition plug 1, as described above, the fuel air mixture flow peeling around the receiving antenna 17 is directed toward the ignition plug 1. Accordingly, the fuel air mixture concentrates on the ignition plug 1 without diffusion, and it is possible to increase combustion efficiency, and thus improve fuel efficiency.

The present invention is not limited to the present embodiment described above.

In the present embodiment described above, it has been described that the receiving antenna 17 is provided on the intake valve 11. However, depending on the intensity of the tumble flow, the receiving antenna may be provided on the exhaust valve, or may be provided on both the intake valve and the exhaust valve.

Figure 4:
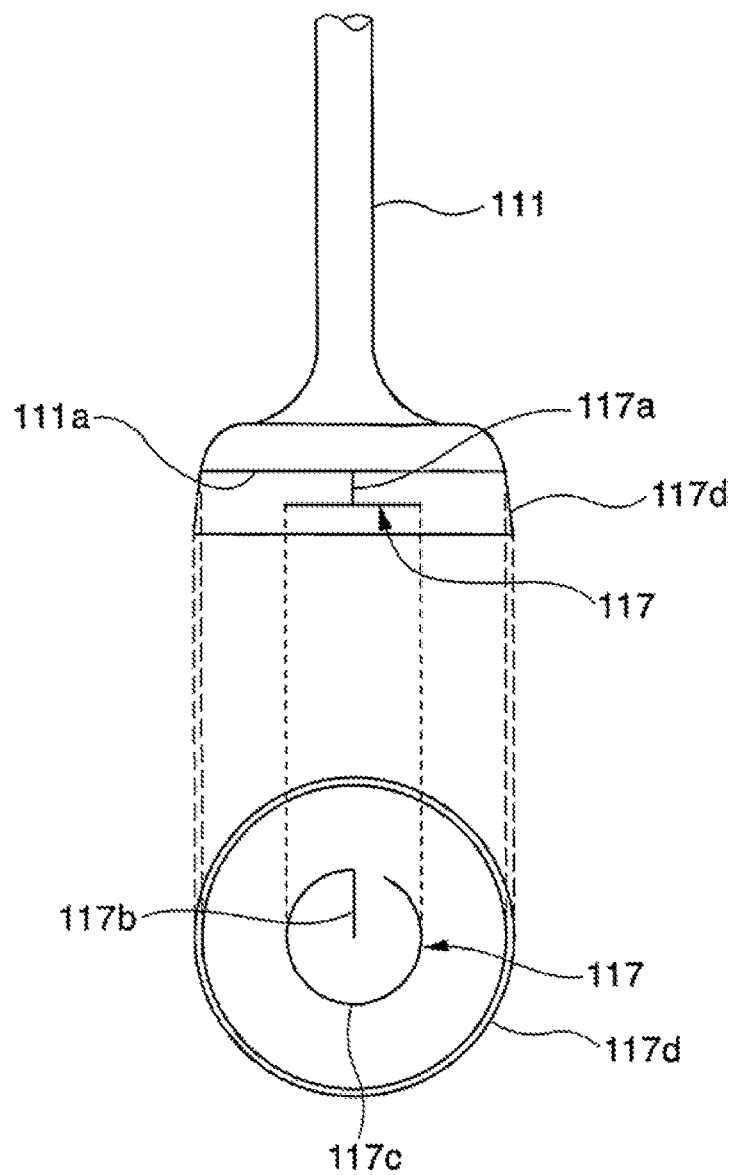
FIG. 4 is a front view and a top view of a receiving antenna according to another embodiment of the present invention.

Furthermore, as shown in FIG. 4, the receiving antenna may be in the form of an arc-like shape, and provided on the intake valve, for example. In FIG. 4, an receiving antenna 117 is constituted by a first straight part 117a that extends in an axial direction of an intake valve 111 from a center of a combustion chamber-facing surface of the intake valve 111, i.e., a lower surface 111a, a second straight part 117b that extends in a direction perpendicular to the first straight part 117a from a distal end of the first straight part 117a, an arc part 117c constituted by an arc centered on the distal end of the first straight part 117a and connected to a distal end of the second straight part 117b, and a covering part 117d that covers the first and second straight parts 117a and 117b and the arc part 117c. The arc part 117c is formed on an imaginary plane that passes through the distal end of the first straight part 117a and is perpendicular to the first straight part 117a. The arc part 117c is formed in an arc shape smaller in diameter than the lower surface 111a of the intake valve 111. Therefore, the arc part 117c is not exposed from a side surface of the covering part 117d, which is formed by an extension of a side surface of the intake valve 111. In the present embodiment, the material of the receiving antenna 117 may be the same as that of the intake valve 111, and may be different electrically-conducting material such as, for example, copper foil. The covering part 117d is formed by ceramic, for example. In FIG. 4, the covering part 117d is shown as being transparent for a purpose of clearly illustrating the receiving antenna 117. However, the covering part 117d is not required to be transparent.

According to the configuration described above, although the covering part 117d is exposed to the combustion chamber 6 in a state in which the intake valve 111 is closed, since the covering part 117d is approximately in a shape of a truncated cone, the covering part 117d will not peel the tumble flow. Since the tumble flow is not disturbed, the combustion is promoted even in the vicinity of the intake valve 111 owing to expansion of the plasma due to expansion of the electric field by the receiving antenna 117, and it is possible to increase combustion efficiency, which will contribute to fuel consumption reduction.

As described above, the receiving antenna 117 may be provided on the exhaust valve, and may be provided on both the intake valve and the exhaust valve.

In place of the magnetron as described above, a source of the microwave may be a travelling wave tube or the like, and may include a microwave oscillation circuit using semiconductors.

Furthermore, unlike the transmission antenna according to the present embodiment described above, a transmission antenna may be provided separately from the ignition plug. In this case, for example, a horn type transmission antenna may be employed. It is preferable that the antenna of this type may be provided in the vicinity of the central electrode 14 of the ignition plug 1.

Furthermore, the central electrode of the ignition plug 1 may be designed to function as an antenna. In this case, it is preferable that the ignition plug is of a type without resistors. If a microwave of a constant voltage is continuously applied to the central electrode, the temperature of the central electrode will excessively increase. Therefore, it is preferable to control the applied voltage of the microwave so that the temperature of the central electrode should be below an upper limit value determined based on a heat resistant temperature of the central electrode.

Furthermore, in the present embodiment described above, it has been described that the microwave is utilized to create the electric field. However, a high frequency wave of a different frequency such as a frequency lower than that of the microwave may be employed.

Also, particular configurations of other constituent elements are not limited to the present embodiment described above, and various modifications are possible within the scope of the present invention.

INDUSTRIAL APPLICABILITY

The present invention may be applied to a spark ignition type internal combustion engine that requires a spark discharge by an ignition plug to ignite a fuel such as gasoline and liquefied natural gas.

EXPLANATION OF REFERENCE NUMERALS

1 Ignition Plug
6 Combustion Chamber
11 Intake Valve
12 Exhaust Valve
16 Transmission Antenna
17 Receiving Antenna

What is claimed is:
1. An ignition device for a spark ignition type internal combustion engine, comprising:
an ignition plug; and
a transmission antenna that is provided in the vicinity of the ignition plug and is adapted to transmit an electromagnetic wave into a combustion chamber, wherein
the ignition device allows a spark discharge generated between a central electrode and a ground electrode of the ignition plug to react with an electric field created via the transmission antenna in the combustion chamber so as to generate plasma and thus ignite fuel air mixture,
the ignition device further comprises a receiving antenna arranged on a combustion chamber-facing surface of at least one of an intake valve and an exhaust valve, and is adapted to receive the electromagnetic wave transmitted from the transmission antenna, and an axial direction of the receiving antenna is oriented toward an extension line axially extended from the central electrode of the ignition plug.

2. The ignition device according to claim 1, wherein the receiving antenna protrudes from a central part of the combustion chamber-facing surface of at least one of the intake valve and the exhaust valve, the axial direction of the receiving antenna intersecting with the extension line extended from the central electrode of the ignition plug.

* * * * *